Patented Dec. 20, 1927.

1,653,482

UNITED STATES PATENT OFFICE.

OSCAR SPENGLER, OF DESSAU, ANHALT, GERMANY, ASSIGNOR TO I. G. FARBENINDUSTRIE AKTIENGESELLSCHAFT, OF FRANKFORT, GERMANY.

FLUX APPLIED IN SOLDERING ALUMINUM AND ITS ALLOYS.

No Drawing. Application filed December 24, 1923, Serial No. 682,545, and in Germany June 23, 1922.

A flux which may be applied in soldering aluminum has to act in the following manner:

1. It has to dissolve the oxides of the aluminum and to cleanse the metallic surface.

2. It has to dissolve the oxides of the metal serving as solder and to cleanse its surface.

3. It should melt at such a temperature that the dissolving effects occur without excessive oxidation of the metals and without decomposition of the flux.

I have found that fluxes of the qualities, which make it possible to apply as solder all metals of a melting point lower than that of the aluminum (for instance lead, tin, zinc, cadmium and their alloys), may be obtained by employing mixtures which contain halogen salts of the alkali metals and such compounds as are capable of dissolving the oxides of the solder for instance zinc halogenides, cadmium halogenides, etc.; addition may be made of compounds lowering the melting point of the flux, for example alkaline earth metal halogenides.

As examples for the fluxes the following are given:

(1) 25 parts of lithium chloride, 12.5 parts of sodium fluoride, 37.5 parts of potassium bromide, 25 parts of zinc chloride.

(2) 25 parts of lithium chloride, 12.5 parts of sodium fluoride, 37.5 parts of calcium chloride, 25 parts of zinc chloride.

(3) 25 parts of lithium chloride, 12.5 parts of sodium fluoride, 37.5 parts of potassium bromide, 25 parts of cadmium chloride.

The invention is not limited to the foregoing examples; the proportions of the components of the mixtures may be varied within wide limits.

The soldering action with aid of the described fluxes is very simple. The objects are cleansed in the known manner and covered on the places to be soldered with the flux and then heated until they possess the necessary temperature. The flux has then melted. Hereafter the solder is used which flows smoothly. After cooling the soldered parts show a very great mechanical tenacity.

In the following claims the expression "halogenides of alkali-forming metals" is used to cover halogenides of both the alkalimetal group, e. g., lithium chloride, and those of the alkaline-earth metal group, e. g., calcium chloride.

What I claim is,—

1. A flux for soldering aluminum and its alloys, including approximately 25 percent of a halogenide of a metal capable of dissolving the oxides of the metal to be soldered and the soldering metal and about 75 percent of a mixture of three halogenides of alkali-forming metals including a substantial amount of halogenides of alkali metals.

2. A flux for soldering aluminum and its alloys, including approximately 25 percent of a halogenide of a metal capable of dissolving the oxides of the metal to be soldered and the soldering metal and about 75 percent of a mixture of three halogenides of alkali-forming metals including a substantial amount of a halogenide of an alkali metal and a substantial amount of a halogenide of an alkaline earth metal.

3. A flux for soldering aluminum and its alloys, including approximately 25 percent of a halogenide of a metal capable of dissolving the oxides of the metal to be soldered and the soldering metal and about 75 percent of a mixture of three halogenides of alkali-forming metals including in substantially equal proportions salts of alkali-metals and the salt of an alkaline earth metal.

4. A flux for soldering aluminum and its alloys, including approximately 25 percent of a halogenide of a metal capable of dissolving the oxides of the metal to be soldered and the soldering metal and about 75 percent of a mixture of three halogenides of alkali-forming metals including in substantially equal proportions salts of alkali metals and calcium chloride.

5. A flux for soldering aluminum and its alloys, including approximately 25 percent of a halogenide of a metal capable of dissolving the oxides of the metal to be soldered and the soldering metal and about 75 percent of a mixture of three halogenides of alkali-forming metals including in substantial proportions lithium chloride and calcium chloride.

6. A flux for soldering aluminum and its alloys, including approximately 25 percent of a halogenide of a metal capable of dissolving the oxides of the metal to be soldered and the soldering metal and about 75 percent of a mixture of three halogenides of alkali-forming metals including about 25 percent of lithium chloride and about 37.5 percent of calcium chloride.

7. A flux for soldering aluminum and its alloys, including approximately 25 percent of a halogenide of a metal capable of dissolving the oxides of the metal to be soldered and the soldering metal and about 75 percent of a mixture of three halogenides of alkali-forming metals including about 25 percent of lithium chloride, about 12.5 percent of sodium fluoride and about 37.5 percent of calcium chloride.

8. A flux for soldering aluminum and its alloys, including approximately 25 percent of zinc chloride, about 25 percent of lithium chloride, about 12.5 percent of sodium fluoride and about 37.5 percent of calcium chloride.

In testimony whereof I affix my signature.

DR. OSCAR SPENGLER.